INVENTOR.
Irvin O. Wolf Jr.
Walter L. Black 3,410,595
TIME-DELAY MECHANISM
Irvin O. Wolf, Jr., Lutherville, and Walter L. Black, Upper Falls, Md., assignors, by mesne assignments, to the United States of America as represented by the Secretary of the Navy
Continuation-in-part of application Ser. No. 476,219, July 30, 1965. This application Apr. 28, 1967, Ser. No. 635,956
6 Claims. (Cl. 294—83)

ABSTRACT OF THE DISCLOSURE

This time-delay mechanism for releasing a torpedo includes a locking stud which normally is held against a locking cam by spring pressure to prevent rotation of a sector gear and related inertia wheel. The occurrence of drogue and main parachute loads is required to move the locking stud aft thereby freeing the cam only during such periods of selected peak loads, permitting selected rotation of the inertia wheel and sector gear. Torpedo release occurs only after the locking cam and the functionally connected sector gear and inertia wheel have rotated sufficiently to move the locking cam out of the path of the locking stud.

---

This is a continuation-in-part of application Serial No. 476,219 filed July 30, 1965, and now abandoned.

The invention described herein may be manufactured and used by or for the Government of the United States or America for governmental purposes without the payment of any royalties thereon or therefor.

This invention relates to a time-delay safety mechanism for use in combination with a release mechanism for the prevention of a premature separation of a parachute from its load.

For accurate delivery of a torpedo to its waterborne target, upon release from a high speed jet bomber, it has become necessary to provide a means of control of the torpedo's trajectory while air-borne. In many cases, this is accomplished by deployment of a parachute, which will not only control the torpedo during flight, but which will also automatically separate from the load when the torpedo enters the water. This latter action is necessary so as not to impede the accuracy of the waterborne propulsion of the torpedo to its target.

However, in some cases, it has been found that, upon deployment of the parachute, a premature separation would occur between the missile and the chute prior to water entry. This resulted in not only loss of accuracy but, in some cases, destruction of the missile upon impact with the water.

The primary object of this invention is to provide a mechanism for use in the prevention of the premature release of a parachute from an airborne missile.

Another object is to provide a time-delay device for use in the prevention of a premature separation of a parachute from its load.

A further object is to provide a time-delay device for use in combination with the release mechanism of a parachute.

Figure 1:
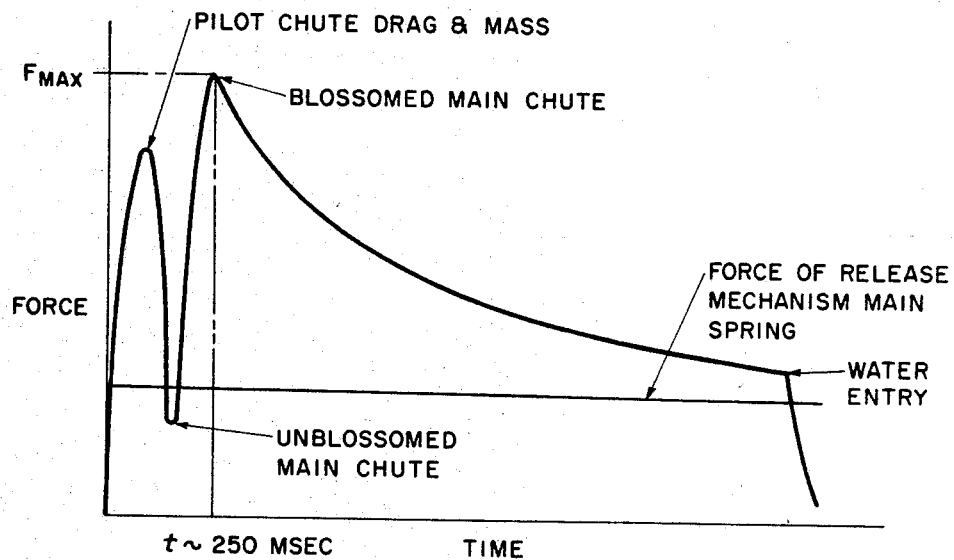
Figure 2:
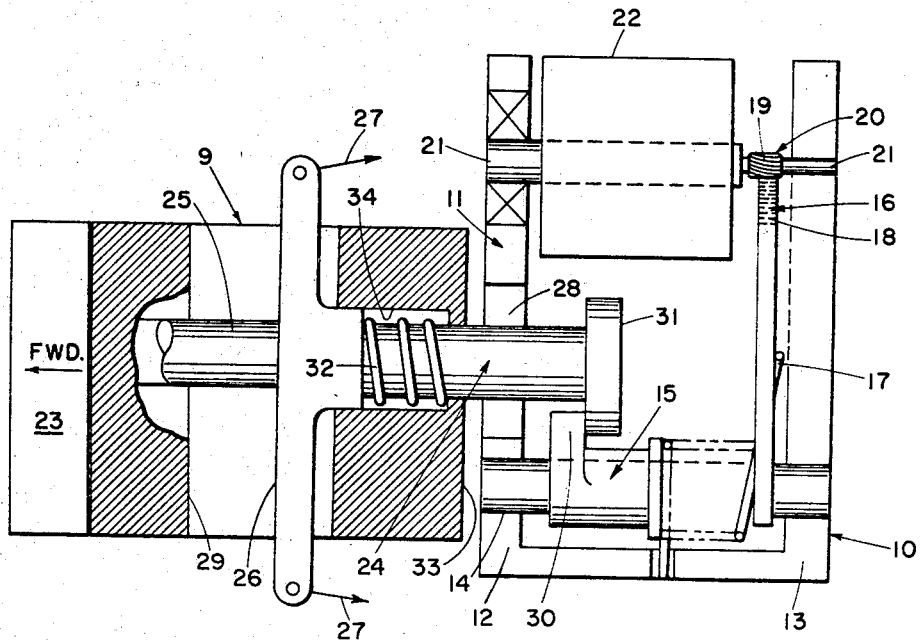

Other objects and many of the attendant advantages of this invention will be readily appreciated as the same becomes better understood by reference to the following detailed description when considered with the accompanying drawings, in which FIG. 1 is a graph of the force on a torpedo of parachute deployment with respect to time; and FIG. 2 is a schematic view of the apparatus of this invention.

To more fully appreciate the difficulties of the prior art and the advantages of this invention, reference is made to FIG. 1 wherein a graph of the parachute deployment force as felt by the torpedo is characterized in relationship to time. As may be seen, the first peak or snatch load, as it is called, is the result of the drag of the pilot chute and the mass of the main chute accelerating to the rear of the torpedo under the influence of the drag force of the pilot chute. The main parachute and its shroud lines are stretched as a result of the initial snatch force. At the instant the mass of the main parachute and pilot chute have been decelerated to zero with respect to the torpedo, the energy stored in the parachute shroud lines tends to dissipate by contracting the shroud lines and parachute back to free length. Consequently, the force felt by the torpedo drops off rapidly to a minimum level equal to the drag of the pilot chute and the unblossomed main chute.

At some point during the shroud line contraction process, the main parachute begins to fill with air and to blossom. This event causes the second inflection point in the force-time curve. Since the drag area of the main parachute is constantly increasing, and drag force is a direct function of area at any given velocity, the drag force felt by the torpedo increases to a maximum at full inflation of the main parachute. The drag force then decays as a function of velocity squared until terminal velocity is reached at water entry.

The problems associated with the premature separation of the parachute from its load occur during the first 250 msec. time interval after torpedo launching, represented by the portion of the force-time curve containing the three inflection points. This time interval is a period of relative instability characterized by transient loads and oscillations. A premature release would occur if the drag force present in the system, between the initial snatch load peak and the peak due to full main chute inflation, was to fall below the force level of the main spring of the release mechanism. This condition could exist due to slow or impaired parachute inflation, loss of the pilot chute or relaxation of shroud line tension due to vibration.

A device for use in preventing a premature release of a parachute during the time interval characterized in FIG. 1 by the three inflection points is shown in FIG. 2. As shown in box form, a parachute release mechanism, which is secured to the rear of a torpedo, is provided with a locking stud which is in separable engagement with a locking cam of the time-delay safety mechanism.

The device of the invention comprises a release mechanism 9 which is releasably engaged with a time-delay safety mechanism 10. As shown in FIG. 1, time-delay safety mechanism 10 includes a housing 11 having walls 12 and 13 between which a rotatable shaft 14 is transversely mounted. A locking cam 15 and a sector gear 16 are mounted on shaft 14 and secured thereto by conventional means such as set screws, not shown. A torsion spring 17 also is mounted on shaft 14 and arranged in such a manner that one end of the spring 17 is secured to the housing 11 and the other end to sector gear 16. Shaft 14 preferably is restricted by means not shown to rotation in one direction, namely counterclockwise as seen from the aft end in FIG. 2, while in the present embodiment sector gear 16 preferably subtends substantially 60° of arc.

Sector gear 16 is provided with a plurality of teeth 18 which are adapted to engage teeth 19 of a pinion gear 20. The pinion gear is secured on a second shaft 21 carried transversely between walls 12 and 13 of housing 11 in spaced relationship to shaft 14. Pinion gear 20 is operatively connected to an inertia wheel 22 through the shaft 21 upon which it is mounted.

When installed on a torpedo 23, a release spool locking stud 24, having secured to the shaft 25 thereof a yoke 26 to which parachute shroud lines 27 are connected, projects into housing 11 through an opening 28 therein and is separably engaged by locking cam 15. Release mechanism 9 has an open intermediate portion 29 wherein yoke 26 is accommodated for movement. Locking cam 15 has a protruding sector 30 which is rotated into engagement with a flange 31 on locking stud 24 and normally functions as an obstruction means in the path of locking stud 24 by preventing removal of the locking stud from housing 11. With locking stud 24 thus retained, release mechanism 9 is secured to torpedo 23 so that its premature removal therefrom is precluded. A compression spring 32 is interposed between yoke 26 and the aft end 33 of release mechanism 9 in a recess 34 therein.

Release mechanism 9 and time-delay mechanism 10 are assembled by forcing locking stud 24 aft against the resistance of compression spring 32 preferably by means of force exerted through the forwardly extending shaft 25 of locking stud 24. When flange 31 has been moved aft a sufficient distance, locking cam 15 and sector gear 16 are rotated against the resistance of torsion spring 17 to a position where protruding sector 30 obstructs flange 31. With the components thus positioned, locking stud 24 is allowed to move forward under the urging of compression spring 32 until flange 31 of the locking stud engages the protruding sector 30 of locking cam 15 thereby preventing further movement of the components of the device.

During the onset of the parachute snatch load, the compression force applied by spring 32 is overcome and locking stud 24 moves aft relieving the load on locking cam 15 and the latter, plus sector gear 16, are free to rotate under the controlled influence of torsion spring 17. The rate at which the locking cam 15 rotates varies directly with the torque delivered by torsion spring 17, and inversely with the product of the inertia of inertia wheel 22 and the square of the gear ratio between shafts 14 and 21. For this embodiment of the invention a suitable gear ratio is one having substantially 220 teeth on the sector gear 16 and 11 teeth on the pinion 20. These three control factors may be varied as desired to establish a suitable rotational rate for locking cam 15. In this embodiment, the values for these parameters were selected so that a time period greater than .250 second is required for locking cam 15 to rotate sufficiently to remove protruding sector 30 from the path of the flange 31. Such a time period assures that the main parachute will be fully blossomed, as shown by the occurrence of the third inflection point at .250 second in FIG. 1, before the release mechanism is unlocked and locking stud 24 is free to move forward for release of the parachute from torpedo 23.

A stepwise description of operation may now be presented to illustrate the function of the components of the device. When the device including torpdeo and parachute system is deployed, the first action is the onset of a drag force from the drogue chute, not shown, with the force building up to a value represented by the first inflection peak in FIG. 1. This chute load is transmitted to shroud lines 27 and overcomes the force of the compression spring 32 which causes the locking stud 24 to move aft thus removing the load between flange 31 and the protruding sector 30. Locking cam 15 is now free to rotate under the influence of the torque stored in torsion spring 17, but as locking cam 15 begins to rotate, the inertia wheel 22 is also accelerated since it is operationally connected to locking cam 15 by sector gear 16 and pinion 20. This arrangement has the effect of greatly increasing the rotational inertia of the system of rotating parts and thus, by the natural laws of dynamics, controls the rate at which locking cam 15 rotates. The characteristics of the parachute system are such that after reaching an initial peak the drag force diminishes, and if such force decreases to a value less than the force of spring 32, locking stud 24 moves forward and flange 31 engages the protruding sector 30 stopping rotation of locking cam 15 and of the operationally attached parts. As the main parachute reaches a blossomed condition the drag force is re-established and builds up to the third inflection point as shown in FIG. 1. This action again overcomes the force of spring 32, locking stud 24 moves aft, and locking cam 15 is again released and is free to rotate. At this time the parachute load persists for a period of several seconds during which time locking cam 15 completes its rotation and protruding sector 30 is removed from the path of flange 31. When the torpedo enters the water, the parachute load is released and spring 32 moves locking stud 24 forward through opening 28 since it is no longer inhibited by locking cam 15. This action causes the torpedo release mechanism to function separating the parachute assembly from the torpedo.

An important feature in the operation of the invention is the direct connection between parachute shroud lines 27 and locking stud 24 for preventing premature release of torpedo 23. As indicated previously, forces in the shroud lines are transmitted through yoke 26 to locking stud 24 against the action of compression spring 32, which spring ultimately serves to release the torpedo. The force exerted by the parachute shroud lines on yoke 26 is effective to hold locking stud 24 in its retracted position after the conclusion of the time delay period until such time as the force exerted on yoke 26 by shroud lines 27 is less than the oppositely directed force of spring 32. Locking stud 24 slidably extends through a bore, not shown, in the adjacent wall of torpedo 23 to a suitable operating mechanism, not shown, which is enabled to release the torpedo upon the locking stud moving to its forwardmost position under the influence of spring 32. This position can be attained, of course, only after release by the protruding sector 30 of locking cam 15 at the conclusion of the time delay period.

As the force exerted on yoke 26 by the parachute shroud lines after blossoming of the main parachute is sufficient to oppose the force of spring 32 until shortly after the torpedo enters the water, premature release of torpedoes is precluded.

Obviously, many modifications and variations of the present invention are possible in the light of the above teaching. It is therefore to be understood that within the scope of the appended claims, the invention may be practiced otherwise than as specifically described.

What is claimed is:

1. In a parachute release mechanism for preventing the premature separation of a parachute system from its load, the combination therewith of:

a safety mechanism separably engaged with said release mechanism,
  said safety mechanism including time release means adapted to prevent operation of said release mechanism until the occurrence of selected drag forces during deployment of said parachute system;

said release mechanism including locking means adapted to be releasably engaged with said safety mechanism;
  said release mechanism including cam means normally disposed to engage said locking means;

said locking means adapted to be selectively disengaged from said cam means during the occurrence of the aforementioned drag forces;
  said locking means normally being frictionally engaged with said cam means;

said frictional engagement being suspended during the occurrence of drag forces;

said cam means obstructing movement of said locking means;

rotating means connected to said cam means for selectively removing said cam means from obstructing said locking means;

inertia means connected to said rotating means for controlling the rotary movement of said cam means;

gear means connecting said inertia means to said rotating means; and torsion drive means connected between said safety mechanism and said gear means for inducing movement of said cam means out of engagement with said locking means upon the elapse of a selected period of time;

said locking means being disposed for axial movement in said release mechanism and including a flange at one end positioned for selective engagement with said cam means and a yoke in its intermediate portion to which the shroud lines of the parachute system are connected, said locking means at its other end effecting separation of said release mechanism from a torpedo load when said cam means no longer obstructs the flange of said locking means.

2. The device of claim 1 and further including compression means interposed between said yoke and a surface of said release mechanism for normally urging said flange into contact with said cam means.

3. The device of claim 2 wherein said time release means includes an inertia wheel rotatably connected to said rotating means;

said compression means further compressible by the drag forces occurring at the opening of a drogue chute and the blossoming of a main chute so as to delay separation of said release mechanism until a selected time after the main chute has blossomed.

4. A parachute load release means for delaying release until the occurrence of selected events, comprising:

a release mechanism and operating means connected thereto and to a parachute load for effecting release of the load upon the occurrence of said selected events;

timed locking means connected to said release mechanism for establishing parameters defining said selected events;

parachute shroud lines connecting a parachute system to said operating means for relaying parachute drag forces thereto;

said release mechanism including a housing adapted to receive said operating means and to be separated from the parachute load upon selected movement of said operating means, said operating means including a stud having a flange at one end;

said timed locking means adapted to releasably receive the flanged end of said stud;

said timed locking means including means protruding into the path of said flange to selectively block movement thereof; and inertia means in said timed locking means connected to said protruding means to selectively control the operation thereof, whereby the occurrence of selected events causes said timed locking means to free said operating means so as to effect release of said load.

5. The device of claim 4 wherein said release mechanism includes spring means disposed to urge said operating means toward said load and to effect release of said load after said protruding means has been removed from the path of the flanged end of said operating means.

6. A parachute load release means for delaying release until the occurrence of selected spaced drag force events, comprising:

a release mechanism and operating means connected thereto and to a parachute load for effecting release of the load upon the occurrence of said selected events;

timed locking means connected to said release mechanism for establishing parameters defining said selected events;

parachute shroud lines connecting a parachute system to said operating means for relaying parachute drag forces thereto;

said release mechanism including a housing adapted to receive a portion of said operating means;

said operating means including detent means projecting into said timed locking means; and inertia means in said timed locking means selectively engaging said detent means;

said release mechanism adapted to be separated from the parachute load upon selected withdrawal of said detent means from said timed locking means, whereby the occurrence of at least two spaced selected drag forces will cause said timed locking means to free said operating means so as to effect release of said load.

References Cited

UNITED STATES PATENTS

| | | | |
|---|---|---|---|
| 2,682,425 | 6/1954 | Staats | 294—83 |
| 2,919,154 | 12/1959 | Schart | 294—83 |
| 3,066,970 | 12/1962 | Haake | 294—83 |
| 3,249,328 | 5/1966 | Knowles | 294—83 |

GERALD M. FORLENZA, *Primary Examiner.*

G. F. ABRAHAM, *Assistant Examiner.*